United States Patent [19]
Ihle et al.

[11] Patent Number: 5,482,583
[45] Date of Patent: Jan. 9, 1996

[54] PROCESS AND AGENT FOR ANCHORING SECURING ELEMENTS IN DRILL HOLES

[76] Inventors: Clausdieter Ihle, Larchenweg, D-7840 Mullheim 14; Volker Banhardt, Neue Kirchstr. 19, D-7801 Ballrechten-Dottingen, both of Germany

[21] Appl. No.: 137,003

[22] PCT Filed: Mar. 26, 1992

[86] PCT No.: PCT/EP92/00671

§ 371 Date: Apr. 28, 1994

§ 102(e) Date: Apr. 28, 1994

[87] PCT Pub. No.: WO92/18697

PCT Pub. Date: Oct. 29, 1993

[30] Foreign Application Priority Data

Apr. 13, 1991 [DE] Germany .......................... 41 12 153.8
Nov. 28, 1991 [DE] Germany .......................... 41 39 069.5

[51] Int. Cl.$^6$ .......................... E21B 33/00; B29C 65/54
[52] U.S. Cl. .......................... 156/91; 156/92; 156/293; 52/295; 411/82; 411/258
[58] Field of Search .......................... 156/91, 92, 293; 264/35, 331.12; 52/743, 295; 411/82, 258

[56] References Cited

U.S. PATENT DOCUMENTS

| | | |
|---|---|---|
| 2,110,053 | 3/1938 | Phillips . |
| 4,152,185 | 5/1979 | Tessenske . |
| 4,198,793 | 4/1980 | Sato et al. . |
| 4,738,878 | 4/1988 | Anderson et al. . |
| 4,983,083 | 1/1991 | Froehlich et al. .......................... 411/82 |
| 5,249,898 | 10/1993 | Stepanski et al. .......................... 411/82 |

FOREIGN PATENT DOCUMENTS

| | | |
|---|---|---|
| 0319736 | 6/1989 | European Pat. Off. . |
| 1296107 | 5/1962 | France . |
| 1948339 | 10/1971 | Germany . |
| 2413479 | 10/1974 | Germany . |
| 474236 | 11/1937 | United Kingdom . |
| 470761 | 3/1938 | United Kingdom . |
| 500109 | 3/1939 | United Kingdom . |
| 736164 | 9/1955 | United Kingdom . |

OTHER PUBLICATIONS

I. Skeist, "Handbook of Adhesives", 2. Auflage, herausgegeben von Van Nostrand Reinhold Cy., New York, US, 1977, Kapitel 26 (Epoxy resin adhesives) und 27 (Polyurethane and Isocyanate-based adhesives), siehe Seite 442, Abschnitt: Fillers, Reinforcements and Other Additives.

*Primary Examiner*—Michael W. Ball
*Assistant Examiner*—Sam Chuan Yao

[57] ABSTRACT

The process for anchoring securing elements in drill holes, particularly screws, nails, anchors, clamp irons, and bolts, by using two-component adhesives and metal additives, is such that a) the drill holes optionally rebored, cleaned and degreased in advance are filled up to from half to three quarters with a compressible mixture of highly wear-resistant fibers or chips made of metals, polymers and/or ceramics with an average length smaller than half the drill hole diameter, subsequently, a blocker is optionally added, then both adhesive components are introduced successively or simultaneously, and then the residual portion of the required amount of fibers or chips is filled in, or b) a kneadable mixture is prepared from a compressible mixture of highly wear-resistant fibers or chips with an average length smaller than half the drill hole diameter and both adhesive components, and the mass is forced into the drill holes, and subsequently, the securing elements are inserted and optionally secured. A low molecular weight fungicide may be added to the two-component adhesive to renovate the part of the support adjacent to the drill hole, which support is made of wood, brickwork or concrete.

15 Claims, No Drawings

PROCESS AND AGENT FOR ANCHORING SECURING ELEMENTS IN DRILL HOLES

BACKGROUND OF THE INVENTION

This invention is predominantly directed to a process for anchoring securing elements in drill holes, particularly screws, nails, anchors, clamp irons, and bolts, by using two-component adhesives and metal enforcement. The invention is particularly useful in older, renovation-requiring drill holes in sleepers of track systems as well as in drill holes in floors, walls or ceilings made of wood, concrete, steel or brickwork. In the following specification and claims, sleepers, floors, walls, and ceilings will be referred to as supports.

One process for securing screws or nails, particularly sleeper screws or sleeper nails in material which can deteriorate is known from German Patent 1,948,339 and the Additional Application 2,413,479. Herein, specifically formed clamp pieces or tube-shaped wire meshes or wire grids are used as metal reinforcement. This process has proven useful in practice, but only in cases where the dimensions of the drill hole and the metal reinforcement are well-balanced with respect to each other. For optimum securing, drill holes having different drill hole diameters require differently dimensioned metal reinforcement. As such work most frequently is carried out by unskilled or semi-skilled personnel, there is the danger of improper metal reinforcement choice and thus, unsatisfactory results. Another drawback of the known process is that the screws once tightened using the desired torque are intended not to be loosened again. However, subsequent to the initial tightening, it is often desired to re-loosen the screw and to make corrections on the system to be secured.

Another drawback of the known process is that the two-component adhesives must be premixed before they can be filled into the drill hole. Thus, relatively small amounts must be prepared freshly again and again since setting of the completely mixed two-component adhesive will begin within a few minutes.

SUMMARY OF THE INVENTION

It is the object of the invention to improve and simplify the known process, avoiding the above-mentioned drawbacks. Moreover, the process of the invention is intended to be suitable for drill holes in ceilings (overhead operation) and walls.

Surprisingly, this object is achieved in that a) the drill holes optionally rebored, cleaned and degreased in advance are filled up to from half to three quarters with a compressible mixture of highly wear-resistant fibers or chips made of metals, polymers and/or ceramics with an average length smaller than half the drill hole diameter, subsequently, from 1 to 2 drops of a blocker are optionally added, then both adhesive components are introduced successively or simultaneously, and then the residual portion of the required amount of fibers or chips is filled in, or b) a kneadable mixture is prepared from a compressible mixture of highly wear-resistant fibers or chips with an average length smaller than half the drill hole diameter and both adhesive components, and the mass is forced into the drill holes which, in extreme cases, are rebored, cleaned and degreased in advance.

and when using securing elements without a self-cutting thread, a center hole is preformed and subsequently, the securing elements are inserted and optionally secured.

While mode a) of the process according to the invention is suitable for drill holes in track systems, particularly in sleepers requiring renovation, or drill holes in floors, mode b) is applied for drill holes in wall and ceiling constructions. For both modes of the process, the support is not significant: it may consist of wood, concrete, steel or brickwork.

The process of the invention does not require pre-mixing the two components of the adhesive. Rather, they may be introduced into the drill hole successively or simultaneously, also in unmixed condition, or may be mixed with said fibers or chips to give the kneadable mass. The additive in the form of fibers or chips which is used according to the invention provides good and sufficient mixing of the components in the drill hole.

Furthermore, the process according to the invention permits the use of screws as the securing elements and allows tightening them using the intended torque. Hereby, an immediate nonpositive joint between screw and drill hole wall results. It is even possible to loosen the screw repeatedly during the pot life of the components and to re-tighten it securely without endangering the good overall result. Tightening torques of up to 500 Nm can be achieved without any problem, with the loosening torque being about 200 Nm.

Stripping experiments on screws mounted into 30-year-old clamps using the process of the invention have shown that with a tightening torque of about 50 Nm, a stripping force of up to 67 kN is necessary.

Subsequent to the pot life of the liquid components, i.e., during the setting phase, the screw joint should not be loosened or tightened anymore, if possible. Generally, this setting phase will take from two to five hours. The curing period depends on mixture balance, ambient and material temperature. Subsequent to the setting phase, it is possible again to repeatedly unscrew the screw and screw it in again. For example, this may be necessary to exchange a broken spring washer. In case threads have been damaged by bent screws, a new screw may be cemented into the drill hole.

In order to facilitate removal of the screw after curing, it is advantageous to wipe the screw with an oily rag prior to anchoring in the drill hole, i.e., the oil serves as a release agent between screw and the cured mixture of metal chips and two-component adhesive.

DETAILED DESCRIPTION OF THE PREFERRED EMBODIMENTS

A liquid component A having a formulation of aliphatic and cycloaliphatic epoxy resins, mono- and bifunctional reactive thinners and primers, and a liquid component B having a formulation of aliphatic and/or cycloaliphatic polyamines, polyamidoamines, Mannich bases, and primers, and optionally, promoters have proven useful in the invention.

Good results are also obtained when using as the components C and D of the adhesive, a liquid component C having a formulation of diisocyanates with primers and common additives, and as the liquid component D, a formulation of multifunctional alcohols with primers and adjuvants.

For extreme cases, i.e., for renovating through-holes, in track systems, for example, from 1 to 2 drops of a blocker are added which, on mixing with metal chips, causes thickening of the adhesive system comprising the two components of the adhesive. Such thickening or solidifying of the material prevents falling through the screw hole which is open at the bottom. Suitable as blockers for the process according to the invention are low-viscosity diisocyanates and methacrylates.

In order to renovate the part of the support adjacent to the unstable hole, which support is made of wood, brickwork or concrete, a low molecular weight fungicide may be added to the two components of the adhesive A and B or C and D, which gradually migrates outward penetrating into the rotten part of the support (e.g., a wooden sleeper) and thus, on a medium-term, prevents further infestation by fungi or at least, slows it down.

The fungicides must be compatible with the corresponding components, without reacting with same. In addition, their molecular size must be small, i.e., the molecular weight must be relatively low. This is required in order not to inhibit diffusion of the fungicides from the adhesives matrix into the adjacent wood or brickwork.

The ideal molecular size or the ideal molecular weight depends on the average size or the average molecular weight of the adhesive components and the "mesh width" of the spatial network constituted in bonding. Narrow "meshes" require smaller molecules, larger "meshes" allow for larger molecules. Large "meshes" in the spatial lattice of the adhesive matrix permit more rapid diffusion than small meshes do.

According to the invention, to said two components of the adhesive are added as the low molecular weight fungicide, for instance. Rowalin GZ (Biochema Schwaben, Dr. Lehmann & Co., Memmingen), Rodurol F2 (Biochema Schwahen, Dr. Lehmann & Co., Memmingen) or Konservan RT (ThorChemie GmbH. Speyer) in an amount of from 0.25 to 10% by weight, based on said two components or the adhesive. Preferably, Rowalin GZ is used in an amount of from 0.25 to 3.5% by weight (based on said two components of the adhesive).

For example, the course of operation for a screw hole renovation in track systems is as follows:

1. The old screw is removed from the damaged hole in the sleeper. Prior to reuse, rough dirt, oil and grease residues are removed from the screw using a rag.
2. The screw hole is cleaned from loose dirt and solid particles and, in the case of wood, from rotten wood. Optionally, this may be done by further reboring.
3. About half the compressible mixture of highly wear-resistant metal chips with an average length smaller than half the drill hole diameter is filled in.

With a hole diameter of 26 mm, chips of highly wear-resistant metals or alloys are suitable with a length of from 0.1 to 15 mm as long as the average length is smaller than half the drill hole diameter. Preferably, chips having lengths of from 0.1 to 7 mm are employed. More specifically, if the length of chips is varying and has a relatively broad grading line, the mixture is well-compressible.

4. Liquid component A is filled in (with urethane adhesives, liquid component C).
5. Liquid component B is filled in (with urethane adhesives, liquid component D).

Indeed, it is possible to premix components A and B (with urethane adhesives, components C and D) and to add them as a mixture.

6 The required residual amount of chips is charged to about 1 cm below the edge of the drill hole.
7. When using screws lacking a self-cutting thread, a center hole must be preformed by means of a mandrel or the like.
8. The screw is inserted and tightened using the designated torque.

Using this procedure which is simple even for unskilled personnel, a rate of about 180 renovated drill holes per hour is achieved.

As described above, the process according to the invention is suitable not only for anchoring screws in renovation-requiring drill holes of track systems but generally, for anchoring securing elements, more specifically, nails, anchors, clamp irons, and bolts, in drill holes, for example, in concrete floors but, above all, also in wall and ceiling constructions (mode b). The kneadable mass prepared according to mode b) is forced into the preformed holes of the wall or ceiling construction, the securing element is forced or screwed into this solids kneading plug and tightened. As a rule, the stew has a diameter smaller than the hole by 2 min. Likewise, however, screws too small in size having even smaller diameter, or other securing elements may be attached nonpositively with the process of the invention. Since the kneadable mass cures only after 2 to 5 hrs, a larger amount of plugging mass, once prepared, can be used to plug a large number of drill holes. Thus, the size of the drill holes plays a minor role since the mass is suitable for both large and small drill holes.

The process according to the invention is particularly suitable in cases where the anchoring must meet high requirements and where it is nonetheless necessary in both mounting and at a later time to loosen the screw once again and to re-tighten it.

At the same time, the process of the invention using addition of fungicide has the advantage of likewise renovating that part of the support adjacent to the drill hole, which support is made of wood, brickwork or concrete.

In cases where polymers or ceramics are used as the fibers or chips instead of metals, the final anchoring also represents good electrical insulation. This may be advantageous for anchoring securing elements in overhead line construction.

Thus, at first, the present invention is directed to the process for anchoring securing elements in drill holes, particularly screws, nails, anchors, clamp irons, and bolts, as described above. Further, the invention is directed to an agent for anchoring securing elements in drill holes, consisting of a compressible mixture of highly wear-resistant fibers or chips with an average length smaller than half the drill hole diameter and two components of an adhesive and optionally, a blocker. According to another aspect, an agent is used containing a low molecular weight fungicide to likewise renovate, if necessary, the rotten drill hole environment infested by fungi. Preferably, the agent employed has a quantity ratio between fibers or chips (solids proportion) and the two components of the adhesive and optionally blocker and fungicide (liquid proportion) of 90% by mass to 10% by mass.

Finally, the invention is directed to the use of compressible mixtures of highly wear-resistant fibers or chips with an average length smaller than half the drill hole diameter as an additive in two-component adhesives for anchoring securing elements such as screws in drill holes.

Preferred embodiments of the process according to the invention will be discussed in detail in the following examples.

EXAMPLE 1

Sleepers requiring renovation were rebored to a depth of about 180 mm and a width of 26 mm. Into the drill holes, metal chips were filled having lengths of from 3 to 7 mm. Only about 3±2% had a length of <3 mm. Less than 5% had a length of more than 7 mm. Next, from 10 to 15 g of freshly prepared two-component adhesive was used. The two-component adhesive consisted of liquid component A consisting of a formulation of aliphatic and cycloaliphatic epoxy resins, mono- and bifunctional reactive thinners and primers to control theology, and a liquid component B consisting of a formulation of aliphatic and cycloaliphatic polyamines, polyamidoamines, primers, and promoters. On top of this layer of two-component adhesive, a layer of metal chips was introduced having diameters of between 0.1 to 7 mm. About half of these chips had a length of <1 mm. Only about 15 to 25% had a length of from 4 to 7 mm. To accomodate screws lacking a self-cutting thread, a center hole was preformed.

Into the such prepared drill holes, common screws for rail securing were screwed in. Even after 10 min it was possible to loosen them or tighten them faster. After 6 hrs the two-component adhesive had cured to such strength that the screws could be unscrewed and screwed in again without destroying the freshly formed thread of cemented metal chips.

EXAMPLE 2

For plugging holes preformed in construction or holes to be drilled freshly in floors, walls or overhead, a kneadable mass is prepared from the adhesive components A and B or C and D and the highly wear-resistant metal chips. The metal chips, the average length of which should be smaller than half the hole diameter, are kneaded with the premixed adhesive components A and B or C and D. The adhesive proportion C relative to the metal chips depends on grading line and shape of latter and is between 5% by mass and 15% by mass. The such obtained "solids kneading plug" is forced into the present hole and is compressed by force. Screws having a self-cutting thread may then be screwed in directly. With screws lacking a self-cutting thread, a center hole analogous to Example 1 must be preformed. The amount of solids kneading plug to be used depends on hole size and screws to be used.

It was found that in such way screws having significantly smaller diameter than is the hole diameter also afford nonpositive joints.

EXAMPLE 3

In tunnel and bridge construction, recesses and holes are planned to cover the demand for plug holes arising later, without subsequently damaging the concrete body by drilling. However, since at the time of planning the precise purpose of use of the securing element to be employed is not yet known definitely, the largest required diameter of the holes required later is chosen as a precaution, for example, 16 mm for powerful heavy trucks. These holes are charged according to Example 1 or 2. Thicker screws are screwed in before curing, thinner screws may also be screwed in after curing and have good nonpositive joints.

We claim:

1. A process for anchoring a securing element in a drill hole, comprising:

a) filling the drill hole to from half to three quarters with a compressible mixture of highly wear-resistant fibers or chips made of metals, polymers and or ceramics with an average length smaller than half the drill hole diameter, introducing both adhesive components of a two-component adhesive, then filling in the residual portion of the required amount of fibers or chips;

c) then inserting the securing element into the drill hole.

2. The process according to claim 1, wherein the two-component adhesive comprises a liquid component A having a formulation of aliphatic and cycloaliphatic epoxy resins, mono- and bifunctional reactive thinners and primers, and a liquid component B having a formulation of aliphatic and/or cycloaliphatic polyamines, polyamidoamines, Mannich bases, and primers.

3. The process according to claim 2, wherein said adhesive further comprises a promoter.

4. The process according to claim 1, wherein the two-component adhesive comprises a liquid component C having a formulation of diisocyanates with primers and common additives, a liquid component D having a formulation of multifunctional alcohols with primers and adjuvants.

5. The process according to claim 1, further comprising adding a low molecular weight fungicide to the two components of the adhesive.

6. The process according to claim 5, wherein the low molecular weight fungicide, is Rowalin GZ, Rodurol F2 or Konservan RT in an amount of from 0.25 to 10% by weight relative to both components of the adhesive.

7. The process according to claim 6, wherein said fungicide is Rowalin GZ and is used in an amount of from 0.25 to 3.5% by weight.

8. The process according to claim 1, further comprising adding a blocking amount of a low-viscosity diisocyanate or methacrylate.

9. The process according to claim 8, wherein said blocking amount is 1–2 drops.

10. The process according to claim 1, wherein said securing elements are selected from the group consisting of screws, nails, anchors, clamp irons, and bolts.

11. The process according to claim 1, further comprising reboring, cleaning, and degreasing the holes before filling the same with said compressible mixture in procedure a).

12. The process according to claim 1, further comprising adding a blocker after filling the holes with the compressible mixture but before introducing the adhesive components.

13. The process according to claim 1, wherein said adhesive components are introduced successively.

14. The process according to claim 1, wherein said adhesive components are introduced simultaneously.

15. The process according to claim 5, further comprising preforming a center hole before inserting said securing element when using securing elements without self-cutting threads.

* * * * *